United States Patent
Jaiswal et al.

(10) Patent No.: US 10,997,796 B2
(45) Date of Patent: May 4, 2021

(54) IDENTIFICATION AND REDESIGN OF CRITICAL THIN SEGMENTS BELOW 3D PRINTER RESOLUTION

(71) Applicant: Siemens Industry Software Inc., Plano, TX (US)

(72) Inventors: Prakhar Jaiswal, Buffalo, NY (US); Suraj Ravi Musuvathy, Princeton, NJ (US); Erhan Arisoy, Princeton, NJ (US); David Madeley, Louth (GB)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 16/471,965

(22) PCT Filed: Mar. 30, 2018

(86) PCT No.: PCT/US2018/025338
§ 371 (c)(1),
(2) Date: Jun. 20, 2019

(87) PCT Pub. No.: WO2018/191035
PCT Pub. Date: Oct. 18, 2018

(65) Prior Publication Data
US 2020/0098195 A1    Mar. 26, 2020

Related U.S. Application Data

(60) Provisional application No. 62/483,666, filed on Apr. 10, 2017.

(51) Int. Cl.
*G06T 19/20* (2011.01)
*B33Y 50/02* (2015.01)
(Continued)

(52) U.S. Cl.
CPC .............. *G06T 19/20* (2013.01); *B29C 64/393* (2017.08); *B33Y 50/02* (2014.12); *B33Y 80/00* (2014.12);
(Continued)

(58) Field of Classification Search
CPC ...... G06T 2207/20081; G06T 2200/04; B33Y 80/00; B33Y 10/00; B33Y 99/00
See application file for complete search history.

(56) References Cited

U.S. PATENT DOCUMENTS 10,254,499 B1 *  4/2019  Cohen ................. B23K 26/342
10,751,951 B1 *  8/2020  Nguyen ................. B33Y 50/02
(Continued)

FOREIGN PATENT DOCUMENTS

WO    2016026820 A1    2/2016
WO    2016033129 A1    3/2016

OTHER PUBLICATIONS

Nelaturi et al., Manufacturability Feedback and Model Correction for Additive Manufacturing, ASME, Apr. 2015, vol. 137 / 021015-1, pp. 1-9 (Year: 2015).*

(Continued)

*Primary Examiner* — Samantha (Yuehan) Wang

(57) ABSTRACT

Systems and methods may support identification and redesign of critical thin segments in a 3D model that are below 3D printer resolution. Identification of critical thin segments may include segmenting cross-sectional slices of the 3D model into printable segments and non-printable segments and using a machine learning model trained using geometrical features computed on thin regions to classify the non-printable segments as critical or non-critical. Redesign of critical thin segments may include thickening the critical thin segments such that the segment size of the critical thin segments satisfy a thickening criterion with respect to the (Continued)

printer resolution and smoothing sharp corners added to the cross-sectional slice at an intersection between the critical thin segment and a neighboring printable segment. Redesign of the critical thin segments may account for tolerable overhang.

18 Claims, 10 Drawing Sheets

(51) Int. Cl.
| | |
|---|---|
| *B29C 64/393* | (2017.01) |
| *G05B 13/02* | (2006.01) |
| *G05B 19/4099* | (2006.01) |
| *G06T 5/00* | (2006.01) |
| *G06T 5/30* | (2006.01) |
| *B33Y 80/00* | (2015.01) |

(52) U.S. Cl.
CPC ..... *G05B 13/0265* (2013.01); *G05B 19/4099* (2013.01); *G06T 5/002* (2013.01); *G06T 5/30* (2013.01); *G05B 2219/35134* (2013.01); *G05B 2219/49008* (2013.01); *G06T 2207/20081* (2013.01); *G06T 2219/2016* (2013.01); *G06T 2219/2021* (2013.01)

(56) References Cited

U.S. PATENT DOCUMENTS

| | | | |
|---|---|---|---|
| 2015/0224715 A1* | 8/2015 | Badhani | B29C 64/386 700/98 |
| 2015/0269282 A1* | 9/2015 | Nelaturi | G06F 30/17 700/98 |
| 2015/0269289 A1* | 9/2015 | Kim | G06F 30/20 703/6 |
| 2020/0034496 A1* | 1/2020 | Michiels | G06F 30/00 |

OTHER PUBLICATIONS

Stoyanov et al., Modelling the 3D-Printing Process for Electronics Packaging, Sep. 13-15, 2016, IEEE, 10.1109/ESTC.2016.7764481, pp. 1-8 (Year: 2016).*

Saigopal Nelaturi et al. "Manufacturability Feedback and Model Correction for Additive Manufacturing—Paper No. MANU-14-1193", Journal of Manufacturing Science and Enginee~ASME International, New York, NY US, vol. 137, No. 2, 1 Apr. 1, 2015, pp. 21015-1-21015-9.

Stoyanov Stoyan et al., "Modelling the 3D-printing process for electronics packaging", 2016 6th Electronic System-Integration Technology Conference (ESTC), IEEE, Sep. 13, 2016, pp. 1-6.

PCT International Search Report and Written Opinion of International Searching Authority dated Jun. 29, 2018 corresponding to PCT International Application No. PCT/US2018/025338 filed Mar. 30, 2018.

* cited by examiner

IDENTIFICATION AND REDESIGN OF CRITICAL THIN SEGMENTS BELOW 3D PRINTER RESOLUTION

CROSS REFERENCE TO RELATED APPLICATION

This application claims the benefit of priority to U.S. Provisional Application No. 62/483,666, filed on Apr. 10, 2017 and titled "SYSTEM AND METHOD FOR IDENTIFYING AND REDESIGNING THIN REGIONS IN A 3D MODEL THAT ARE BELOW 3D PRINTER RESOLUTION", which is incorporated herein by reference in its entirety.

BACKGROUND

Computer systems can be used to create, use, and manage data for products and other items. Examples of computer systems include computer-aided engineering (CAE) systems, computer-aided design (CAD) systems, visualization and manufacturing systems, product data management (PDM) systems, product lifecycle management (PLM) systems, and more. These systems may include components that facilitate design and simulated testing of product structures.

SUMMARY

Disclosed implementations include systems, methods, devices, and logic that may support identification and redesign of critical thin segments in a three-dimensional (3D) model that are below 3D printer resolution.

In one example, a method may be performed, executed, or otherwise carried out by a design system, such as a CAE system. The method may include accessing a 3D model representative of an object to be constructed by a 3D printer; extracting a cross-sectional slice of the 3D model perpendicular to a build direction for construction of the object by the 3D printer; and identifying a critical thin segment in the cross-sectional slice with a segment size smaller than a printer resolution of the 3D printer. Identifying the critical thin segment may include segmenting the cross-sectional slice into printable segments and non-printable segments and using machine learning model trained using geometrical features computed on thin regions to classify each of the non-printable segments as critical or non-critical. The method may further include modifying the 3D model by thickening the critical thin segment such that the segment size of the critical thin segment satisfies a thickening criterion with respect to the printer resolution and providing the modified 3D model to the 3D printer for construction of the object.

In another example, a non-transitory machine-readable medium may include instructions executable by a processor to access a 3D model representative of an object to be constructed by a 3D printer; extract a cross-sectional slice of the 3D model perpendicular to a build direction for construction of the object by the 3D printer; identify a critical thin segment in the cross-sectional slice with a segment size smaller than a printer resolution of the 3D printer; and modify the 3D model to account for the critical thin segment. The instructions may be executable by the processor to modify the 3D object model by thickening the critical thin segment such that the segment size of the critical thin segment satisfies a thickening criterion with respect to the printer resolution; identifying, at an intersection between the critical thin segment and a neighboring printable segment, a sharp corner added to the cross sectional slice by the thickening; and further modifying the critical thin segment by smoothing the sharp corner. The instructions may be executable further to provide the modified 3D model to the 3D printer for construction of the object as well.

In yet another example, a system may include a thin segment identification engine and a thin segment redesign engine. The thin segment identification engine may be configured to access a 3D model representative of an object to be constructed by a 3D printer; extract cross-sectional slices of the 3D model perpendicular to a build direction for construction of the object by the 3D printer; and identify critical thin segments in the cross-sectional slices with a segment size smaller than a printer resolution of the 3D printer, including by segmenting the cross-sectional slices into printable segments and non-printable segments and using a machine learning model trained using geometrical features computed on thin regions to classify each of the non-printable segments as critical or non-critical.

The thin segment redesign engine may be configured to modify the 3D model to account for the critical thin segments, including by thickening the critical thin segments such that the segment size of the critical thin segments satisfy a thickening criterion with respect to the printer resolution; identifying, at intersections between the critical thin segments and neighboring printable segments, sharp corners added to the cross-sectional slices by the thickening; and further modifying the cross-sectional slices by smoothing the sharp corners. The thin segment redesign engine may also be configured to provide the modified 3D model to the 3D printer for construction of the object.

BRIEF DESCRIPTION OF THE DRAWINGS

Certain examples are described in the following detailed description and in reference to the drawings.

DETAILED DESCRIPTION

Figure 1:
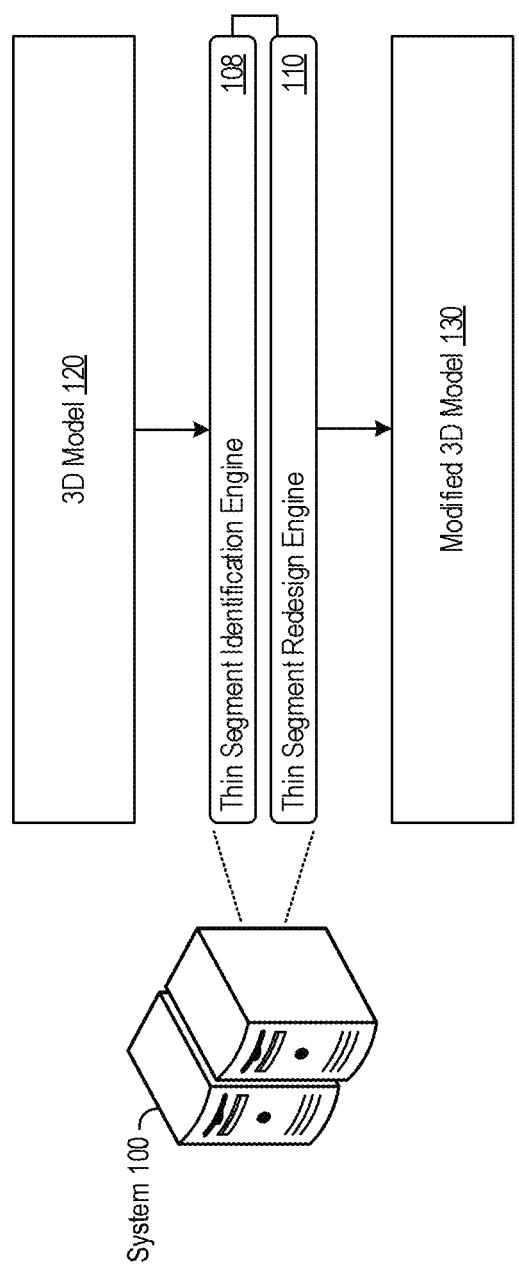
FIG. 1 shows an example of a system that supports identification and redesign of critical thin segments in a 3D model that are below 3D printer resolution.

The disclosure herein may provide systems, methods, devices, and logic for identification and redesign of critical thin segments in a 3D model that are below 3D printer resolution. Additive manufacturing (sometimes referred to as 3D printing) may be performed through use of 3D printers that can construct objects through material deposition. 3D printing technology may be restricted by the minimum size (e.g., amount) of material that the 3D printer can deposit at any given time, which may be referred to as the printer resolution or 3D printer resolution of the 3D printer. As used herein, printer resolution may refer to a 2D resolution (sometimes referred to as XY resolution or minimum feature size) limiting the precision of deposition that a 3D printer can deposit material in a 2D plane (e.g., perpendicular to a build direction).

Finite printer resolutions may limit the capability of a 3D printer to precisely construct aspects of an object, such as very fine features, sharp corners, or other thin sections below a given 3D printer resolution. Any portion of an object below (e.g., smaller than) a specified 3D printer resolution may be referred to as a thin segment or non-printable segment. It may be useful to identify thin segments in a 3D model prior to 3D printing so that corrective measures can be taken.

One approach to identify non-printable segments is to use morphological operations to identify local thin segments in slices of a 3D model. A medial axis transform may be used to prune out corners and thicken the identified thin segments. However, a medial axis transform may not be sufficiently robust and may result in a dense distribution of edges for complex slices that are difficult to handle and process. In another approach, morphological operations may be used in 3D space to identify thin regions and quantify criticality using heuristic measures based on area and geodesic length. However, 3D morphological operations for identifying thin regions for some geometries may not have an accurate resemblance to the actual physical layer-wise printing process and produce less optimal object construction.

The features described herein may increase the capability, efficiency, and effectiveness for identification and redesign of thin segments below 3D printer resolution. For instance, the features described herein may provide for differentiation between critical and non-critical thin segments present in an object. A critical thin segment may refer to any thin segment that is user-designated or otherwise flagged for redesign prior to 3D printing. Example critical thin segments may include thin portions of an object that form main structures in the object, connect different portions of the object, or are otherwise deemed as necessary for proper construction of the object. Non-critical thin segments may refer to thin segments that can be 3D printed without redesign. As such, non-critical thin segments may include sharp corners or other object portions below 3D printer resolution for which imprecise construction is tolerable (e.g., tolerability as controlled or specified through user-input or other mechanisms). Features to classify the criticality of thin segments may increase the efficiency of the thin segment redesign without unnecessary redesign of non-critical thin segments.

As described in greater detail below, classification of critical and non-critical thin segments may be performed based on translation, rotation, and scaling invariant geometric features and a supervised learning approach, which may more accurately resemble the actual physical layer-wise printing process of a 3D printer and increase the robustness of critical and non-critical segment classification. Through use of machine learning processes to support classification, the features described herein may provide a scalable and flexible classification mechanism applicable to objects or object slices of varying geometries and complexities.

Various thin segment redesign features are also described herein, features which may provide for redesign of object parts for which 3D printing is not possible. Redesign of 3D models to account for identified critical thin regions may allow for actual construction of such thin regions through a combination of additive and subtractive manufacturing. Modification of thin segments to support 3D printing may be performed on a layer-by-layer basis, mimicking actual 3D printing to improve accuracy and effectiveness. Moreover, smoothing features are described herein that may reduce or prevent introduction of sharp features or corners that cannot be precisely printed given 3D printer resolutions. As such, the redesign features described herein may support increasingly precise and accurate construction of thin segments of an object, which are possible through a combination of additive and subtractive manufacturing.

FIG. 1 shows an example of a system that supports identification and redesign of critical thin segments in a 3D model that are below 3D printer resolution. The system 100 may take the form of a computing system, including a single or multiple computing devices such as application servers, compute nodes, desktop or laptop computers, smart phones or other mobile devices, tablet devices, embedded controllers, and more. In some implementations, the system 100 implements a CAD or CAE tool through which a user may design product structures for construction using additive manufacturing and specify characteristics for such construction. As described in greater detail herein, the system 100 may identify thin segments in a 3D model of an object, classify critical thin segments among the identified thin segments, redesign the critical thin segments to support 3D printing, or any combination thereof.

As an example implementation, the system 100 shown in FIG. 1 includes a thin segment identification engine 108 and a thin segment redesign engine 110 (though, in some implementations the system 100 includes only one of the thin segment identification engine 108 or the thin segment redesign engine 110). The system 100 may implement the engines 108 and 110 (and components thereof) in various ways, for example as hardware and programming. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the system 100 implements multiple engines using the same computing system features or hardware components (e.g., a common processor and storage medium).

In operation, the thin segment identification engine 108 may identify thin segments present in a 3D model 120 representative of an object to be constructed through 3D printing. To do so, the thin segment identification engine 108 may access the 3D model 120, extract cross-sectional slices from the 3D model perpendicular to a build direction for construction of the object by a 3D printer; and identify critical thin segments in the cross-sectional slices with a segment size smaller than a printer resolution of the 3D printer. To identify the critical thin segments, the thin segment identification engine 108 may segment the cross-sectional slices into printable segments and non-printable segments; and use a machine learning model trained using geometrical features computed on thin regions to classify each of the non-printable segments as critical or non-critical.

In operation, the thin segment redesign engine 110 may redesign identified critical thin segments to support 3D construction. In some implementations, the thin segment redesign engine 110 may modify the 3D model 120 to account for the critical thin segments, including by thickening the critical thin segments such that the segment size of the critical thin segments satisfy a thickening criterion with respect to the printer resolution; identifying, at intersections between the critical thin segments and neighboring printable segments, sharp corners added to the cross-sectional slices by the thickening; and further modifying the critical thin segments by smoothing the sharp corner. The thin segment redesign engine 110 may further provide the modified 3D model 130 to the 3D printer for construction of the object.

These and other thin segment identification and redesign features are described in greater detail next.

Figure 2:
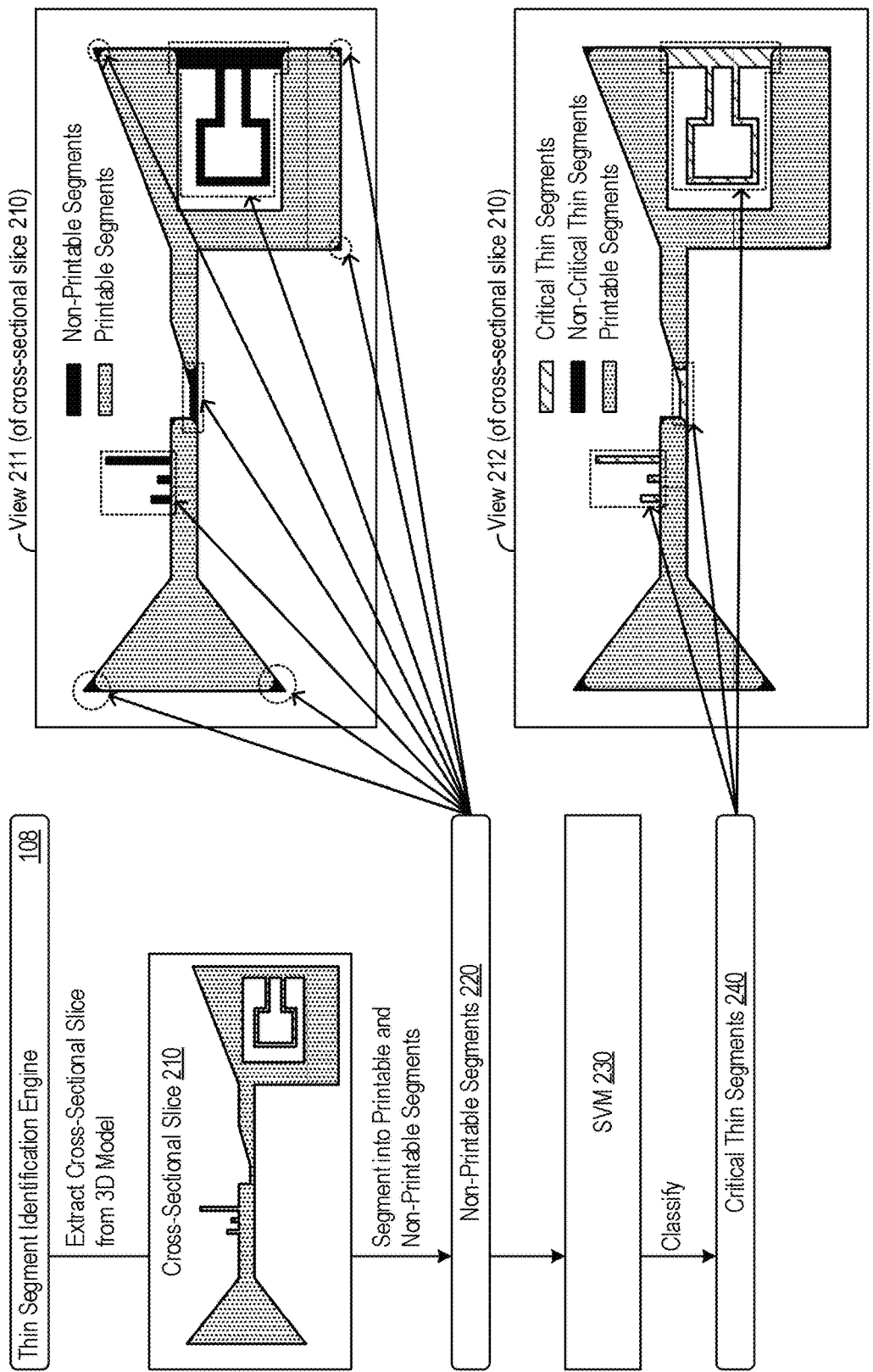
FIG. 2 shows an example of identification of critical thin segments in a 3D model by a thin segment identification engine.

FIG. 2 shows an example of identification of critical thin segments in a 3D model by a thin segment identification engine 108. The thin segment identification engine 108 may access a 3D model representative of an object to be constructed by a 3D printer, such as the 3D model 120 shown in FIG. 1. The thin segment identification engine 108 may access the 3D model 120 from a data store or other source, whether local or remote to the system 100.

The 3D model 120 may include data specifying mathematical representations of a 3D volume/surface of objects such as solid models and shell/boundary models. In some examples, the 3D model 120 may be drawn by a user using CAD tools or accessed from 3D model files (e.g., in a CAD format such as JT or STEP, or other format for storing geometric curves that define the shape of the part). As yet another example, the thin segment identification engine 108 may access the model data generated from a 3D scan of an existing physical object, from which the thin segment identification engine 108 may generate or otherwise obtain the 3D model 120. The thin segment identification engine 108 may identify a build direction for construction of the object represented by the 3D model 120, for instance as specified by a user or otherwise set for the 3D model 120.

The thin segment identification engine 108 may extract cross-sectional slices from the 3D model 120. A cross-sectional slice S can be considered as a closed regular subset of $\mathbb{R}^2$ space. The thin segment identification engine 108 may obtain a particular cross-sectional slice by taking an intersection of the 3D model 120 with a plane perpendicular to the build direction at a particular object height. In that regard, the thin segment identification engine 108 may divide the 3D model 120 into any number of cross-sectional slices, and each cross-sectional slice may represent a 2D cross-section of the 3D object. An example slice is shown in FIG. 2 as the cross-sectional slice 210, which is referenced with respect to continuing examples described herein.

Identification of thin segments may be performed by the thin segment identification engine 108 on a per-slice basis. The thin segment identification engine 108 may do so since many 3D printing processes are performed in layer-wise fashion to construct an object. As the deposition of material in a particular 3D printing layer can be approximated to have a consistent cross-section along the build direction, the thin segment identification engine 108 may analyze a single cross-section corresponding to each slice to identify critical thin segments. Put another way, 3D printer resolution may affect the deposition of material in each cross-sectional slice independently. Instead of identifying thin segments of the 3D model 120 as a whole, the thin segment identification engine 108 may perform layer-wise (that is, slice-wise) thin segment identification of the 3D model in order to more effectively simulate the actual physical layer-wise printing process used by 3D printers.

The thin segment identification engine 108 may segment the cross-sectional slice 210 into printable and non-printable segments. In particular, the thin segment identification engine 108 may subdivide the cross-sectional slice 210 into two mutually exclusive and exhaustive subsets P and Q, with P representing the printable segments and Q representing the non-printable segments (e.g., P∩Q=Ø and P∪Q=S).

Differentiation between printable and non-printable segments of the 3D model 120 may depend on a minimum printer resolution T. For slice-based thin segment identification, the thin segment identification engine 108 may reference the print resolution T as a 2D representation of a minimum amount of deposition material that a 3D printer is capable of depositing. In some implementations, the thin segment identification engine 108 identifies the printer resolution T as a 2D circle shape with a diameter d corresponding to the size of the single bead of material deposited by the 3D printer. However, it should be appreciated that the thin segment identification engine 108 may apply the described features for any arbitrary closed shape applicable to the printer resolution T, e.g., T representing any arbitrary 2D geometry with a corresponding perimeter, area, shape, or other aspects.

In some implementations, the thin segment identification engine 108 uses morphological operations to segment the cross-sectional slice into printable segments (P) and non-printable segments (Q). The thin segment identification engine 108 may use the printer resolution T as a structuring element or filter, whether in the form of a 2D circle or any other 2D geometry that the thin segment identification engine 108 may recognize or associate for the printer resolution T. As example operations, the thin segment identification engine 108 may apply an opening operation (o) as the sequence of two operations, an erosion operation (ε) followed by a dilation operation (δ) using the same structuring element. In such implementations, the thin segment identification engine 108 may compute the non-printable segments Q of a given slice S by taking the difference of the printable region P with the slice S such that:

$$P = o_T(S) = \delta_T(\varepsilon_T(S))$$

$$Q = S - P$$

The non-printable segments (Q) determined by the thin segment identification engine 108 may include the regions in the slice S that a 3D printer (with a printer resolution T) would be unable to print without under-deposition or over-deposition. Put another way, identified thin segments may have segment size smaller than a printer resolution T of a 3D printer. As other examples, the thin segment identification engine 108 may segment a cross-sectional slice into printable and non-printable segments through medial axis computations or other geometrical computations.

View 211 shown in FIG. 2 depicts an example of printable and non-printable segments determined by the thin segment identification engine 108 for the cross-sectional slice 210. In view 211, the printable segments identified by the thin segment identification engine 108 are shown through the dotted patterning and non-printable segments are shown via the blackened patterning. The non-printable segments (Q) determined from the cross-sectional slice 210 are also depicted in FIG. 2 as the non-printable segments 220.

The thin segment identification engine 108 may individually classify the non-printable segments 220 as critical or non-critical. The non-printable segments 220 may include multiple disconnected non-printable regions, as can be seen through the example non-printable segments 220 highlighted in view 211. The thin segment identification engine 108 may classify each of individual non-printable segment as critical or non-critical.

Such criticality determinations may be controlled according to any number of criticality criteria, through which certain types of thin segments can be flagged for redesign. As an illustrative example, the non-printable segments 220 may include the sharp corners of the cross-sectional slice 210. During 3D printing, sharp corners in the cross-sectional slice 210 may be rounded-off as constructing a sharp corner may be practically impossible given 3D printing resolution and deposition material limitations of 3D printing. As such, the rounding of corners in an object may be acceptable in 3D manufacturing up to a certain extent, and the criticality criteria may be configured to deem some or all sharp corners as non-critical thin segments. As another illustrative example, the non-printable segments 220 may include a particular thin segment that links together other printable segments. In this example, accurate construction of the particular thin segment may be required (e.g., to ensure proper object functionality), and thus the criticality criteria may be configured to deem the particular thin segment as critical.

The criticality criteria by which the thin segment identification engine 108 classifies the non-printable segments 220 may be user-configured. Doing so may offer increased flexibility and scalability in differentiating between specific types of thin segments and whether such thin segments require redesigning for accurate construction. For instance, a designer may specify general criticality criteria widely applicable to 3D models of various types, and subsequent users or product groups may specify narrowed criticality criteria specific to a particular product, customer, or design. One mechanism to specify criticality criteria is via training sets of machine learning models.

The thin segment identification engine 108 may use various machine learning techniques to classify non-printable segments as critical or non-critical. For instance, the thin segment identification engine 108 may use any combination of support vector machines (SVMs), supervised or semi-supervised learning models, neural networks, and the like. The specific machine learning model used by the thin segment identification engine 108 may vary based on user or system preference, though the selected machine learning model may be trained or programmed according to specific features to classify criticality of identified non-printable segments. In the specific example shown in FIG. 2, the thin segment identification engine 108 inputs the non-printable segments 220 into a SVM 230 for classification. The SVM 230 may be implemented separate from the thin segment identification engine 108 or as part of the thin segment identification engine 108 itself.

The machine learning model used by the thin segment identification engine 108 (e.g., SVM 230) may be trained using geometrical features computed on a training set of thin regions. The training set may be user-classified so as to effectuate whichever criticality criteria such a user (or set of users or system) requires. The following description provides example features and training sets with respect to the SVM 230 as a particular implementation, though such features and training sets may likewise be used to train various other machine learning models that the thin segment identification engine 108 may access and use.

In some implementations, the SVM 230 is trained with a set of computed thin segments according to twelve (12) features, including: a ratio of segment perimeter to minimum bead perimeter (e.g., the perimeter of the 2D shape associated with a printer resolution T); a ratio of segment area to minimum bead area; a ratio of normalized segment perimeter to normalized segment area; a ratio of normalized segment area to normalized segment perimeter; seven moment invariants (e.g., as described in Hu, Ming-Kuei. "Visual pattern recognition by moment invariants." IRE transactions on information theory 8.2 (1962): 179-187); and a moment invariant (e.g., as proposed by Flusser "On the independence of rotation moment invariants." Pattern recognition 33.9 (2000): 1405-1410).

Described in another way, if the non-printable segments 220 (or training set of computed thin segments) include k disconnected thin segments $q_1, q_2, q_3, \ldots, q_k$, the features $f_{i1}, f_{i2}, f_{i3}, \ldots, f_{i12}$ on a given thin segment $q_i$ may be as follows:

$$f_{i1} = \frac{\text{perimeter}(q_i)}{\text{perimeter}(T)}$$

$$f_{i2} = \frac{\text{area}(q_i)}{\text{area}(T)}$$

$$f_{i3} = f_{i1} / f_{i2}$$

$$f_{i4} = f_{i2} / f_{i1}$$

$$f_{i5} = \eta_{20} + \eta_{02}$$

$$f_{i6} = (\eta_{20} - \eta_{02})^2 + 4\eta_{20}^2$$

$$f_{i7} = (\eta_{30} - 3\eta_{12})^2 + (3\eta_{21} - \eta_{03})^2$$

$$f_{i8} = (\eta_{30} + \eta_{12})^2 + (\eta_{21} + \eta_{03})^2$$

$$f_{i9} = (\eta_{30} - 3\eta_{12})(\eta_{30} + \eta_{12})[(\eta_{30} + \eta_{12})^2 - 3(\eta_{21} + \eta_{03})^2] +$$
$$(3\eta_{21} - \eta_{03})(\eta_{21} + \eta_{03})[3(\eta_{30} + \eta_{12})^2 - (\eta_{21} + \eta_{03})^2]$$

$$f_{i10} = (\eta_{20} - 3\eta_{02})[(\eta_{30} + \eta_{12})^2 - (\eta_{21} + \eta_{03})^2] + 4\eta_{11}(\eta_{30} - \eta_{12})(\eta_{21} + \eta_{03})$$

$$f_{i11} = (3\eta_{21} - \eta_{03})(\eta_{30} + \eta_{12})[(\eta_{30} + \eta_{12})^2 - 3(\eta_{21} + \eta_{03})^2] +$$
$$(\eta_{30} - 3\eta_{12})(\eta_{21} + \eta_{03})[3(\eta_{30} + \eta_{12})^2 - (\eta_{21} + \eta_{03})^2]$$

$$f_{i12} = \eta_{11}[(\eta_{30} + \eta_{12})^2 - (\eta_{03} + \eta_{21})^2] - (\eta_{20} - \eta_{02})(\eta_{30} + \eta_{12})(\eta_{03} + \eta_{21})$$

In this example, $\eta_{uv}$ may refer to the normalized central moment of the segment (for example, see Hu et al.) While these twelve (12) features are provided as examples to train a SVM 230 and classify the non-printable segments 220, fewer, additional, or alternative features are possible for training and classification through the SVM 230 or other machine learning models.

The SVM 230 may be pre-trained, and thus provide a data-driven classification mechanism to differentiate between critical and non-critical thin segments. In leveraging or implementing the SVM 230, the thin segment identification engine 108 may increase computational efficiency as compared to computational-based designs (e.g., based on a medial axis which require heavy geometrical computations that consume increased processing resources and longer processing times). Such computational designs may also be inflexible as predetermined geometric computations may be incapable of adequately classifying segments for object slices numbering in the tens of thousands and more, particularly with slices of all different shapes and characteristics for which computational designs struggle to consistently classify. In contrast, the SVM 230 may utilize moment invariants as features for training and classification, and these features may be invariant to translations, rotations, and scaling transforms. As such, the SVM 230 may provide increased robustness and scalability for criticality classifications of non-printable segments across a wide spectrum different slice shapes and attributes, and do so in near real-time.

In the example shown in FIG. 2, the thin segment identification engine 108 uses the SVM 230 to classify the non-printable segments 220 as critical or non-critical. From such a classification, the thin segment identification engine 108 identifies the critical thin segments 240 from among the non-printable segments 220. These identified critical thin segments 240 are depicted in view 212 shown in FIG. 2, with the printable segments of the cross-sectional slice 210 shown through the dotted patterning, the non-critical thin segments shown via the blackened patterning, and the critical thin segments 240 shown via the diagonal patterning.

The thin segment identification engine 108 may thus identify critical thin segments present in cross-sectional slices of a 3D model.

For a given slice, the system 100 may modify critical thin segments for accurate 3D printing. Doing so may include compensating for the critical thin segments by adding extra deposition material in the 3D model, and thus during actual 3D printing of the object. Redesign processes may be performed by a thin segment redesign engine 110, and the addition of deposition material may be virtually realized by modifying the 3D model to thicken the critical thin segments locally. After actual 3D construction of the object, subtractive manufacturing techniques may be applied to remove the added material (e.g., by machining). Some thin segment redesign features are described next.

Figure 3:
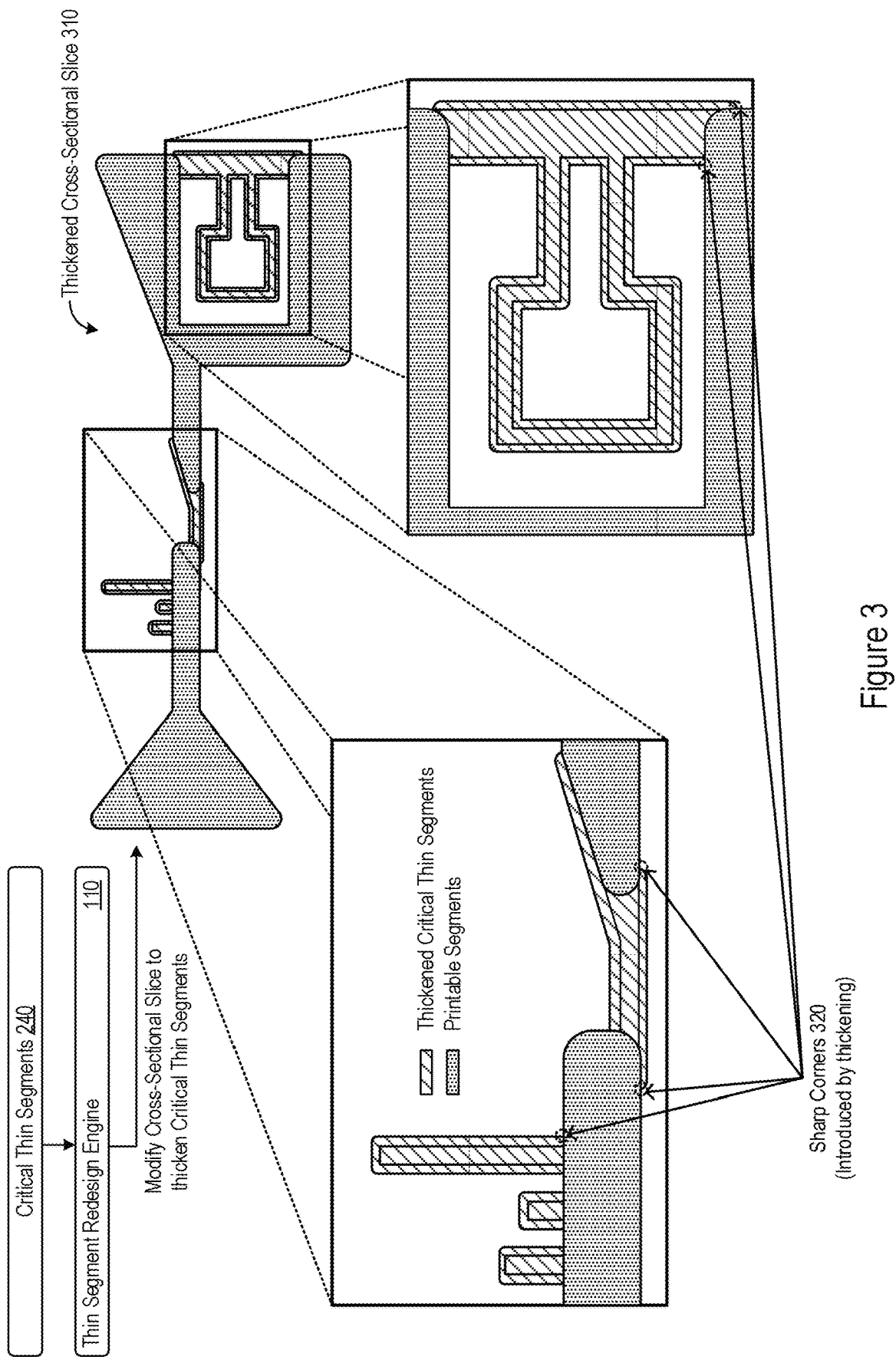
FIG. 3 shows an example of slice modification by a thin segment redesign engine to thicken identified critical thin segments.

FIG. 3 shows an example of slice modification by the thin segment redesign engine 110 to thicken identified critical thin segments. The thin segment redesign engine 110 may modify each of the critical thin segments 240 identified by the thin segment identification engine 108. In particular, the thin segment redesign engine 110 may thicken a given critical thin segment such that the segment size of the given critical thin segment satisfies a thickening criterion with respect to the printer resolution T. For instance, the thickening criterion maybe satisfied when the segment size of the thickened critical thin segment exceeds a threshold percentage of the printer resolution (e.g., 99% coverage to ensure at least 99% of the critical thin segment is printable based on the printer resolution). In other examples, the thickening criterion is specified based on morphological operations used to thicken the critical thin segment. Particular percentages or other thickening criteria may be user-configurable and applied by the thin segment redesign engine 110.

Thickening of the critical thin segments 240 by the thin segment redesign engine 110 may be performed through use of mathematical morphological operations. The amount of thickening by the thin segment redesign engine 110 may vary depending on the original thickness of a given critical thin segment. To address variances in original thicknesses, the critical thin segment 240 may incrementally dilate critical thin segments with a dilation shape over a number of dilation iterations, ceasing the iterative dilation process when the thickening criterion is satisfied. In doing so, the thin segment redesign engine 110 may incrementally increase the dilation or thickening amount applied each dilation iteration, for example doing so by incrementally increasing a size of the dilation shape over successive dilation iterations based on a function of the number of iterations and the printer resolution T. The dilation shape may serve as the structuring element or filter for applied morphological operations to thicken the critical thin segment.

To illustrate with respect to a critical thin region $q_i$, the thin segment redesign engine 110 may dilate the critical thin region $q_i$ with a circular dilation shape $C_b$ of diameter b. In each dilation iteration, the thin segment redesign engine 110 may increment the value of b from 0 to d (the diameter of printer resolution T). In this example, each dilation iteration may use an increased diameter b, increasing in increments of d/m where m is a total number of iterations that may be user-configured or preset (e.g., m=20). After dilating a critical thin segment in a given dilation iteration, the thin segment redesign engine 110 may determine whether the thickening criterion is satisfied. For instance, the thin segment redesign engine 110 may stop the incremental dilation process when the following thickening criterion is met:

$$\text{area}(q_i - o_T(\delta_{C_b}(q_i))) < 0.01 \times \text{area}(q_i)$$

In this thickening criterion, o is the morphological opening of the argument shape associated with the printer resolution T and δ is the dilation by the structuring element $C_b$. This example thickening criterion is thus met when the opening by printer resolution T covers 99% of area of the (now thickened) critical thin segment.

In some examples, the thin segment redesign engine 110 may dilate a critical thin segment through Minkowski additions. In such an example, the thin segment redesign engine 110 may incrementally thicken the critical thin segment $q_i$ using Minkowski sums with a selected shape (e.g., a dilation shape) over a number of dilation iterations. In this example, the thin segment redesign engine 110 may incrementally increase the thickening amount over successive dilation iterations based on a function of the number of dilation iterations and the printer resolution, e.g., in a similar as described above for the circular dilation shape $C_b$ or any other shape applied by the thin segment redesign engine 110.

Some thickening examples are provided above through dilation. In other implementations, the thin segment redesign engine 110 may thicken a critical thin segment in other ways, for example by offsetting the critical thin segment by an offset distance (and thus, additional material) such that the thickening criterion is satisfied. In yet another implementation, the thin segment redesign engine 110 may thicken the critical thin segment by overlaying a material layer that satisfies the thickening criterion.

In any of the ways described herein, the thin segment redesign engine 110 may thicken each critical thin segment among the critical thin segments 240 identified by the thin segment identification engine 108. The thickened critical thin segments $\hat{q}_i = \delta_{T_b}(q_i)$, i=1, 2, ..., k may then be merged by the thin segment redesign engine 110 using a Boolean union operation. The thin segment redesign engine 110 may merge the thickened critical thin segments $\hat{q}_i$ together with the opening $P = o_T(S)$ (that is, the determined printable segments) of the original cross-sectional slice S. As such, the thin segment redesign engine 110 may obtain a thickened cross-sectional slice $\hat{S}$, which may be expressed as:

$$\hat{S} = P \cup \left( \bigcup_{i=1}^{k} \hat{q}_i \right)$$

To illustrate through FIG. 3, the thin segment redesign engine 110 may merge the thickened critical thin segments together with the printable segments of the original cross-sectional slice 210 to form a thickened cross-sectional slice 310. In the thickened cross-sectional slice 310 shown in FIG. 3, the (previously determined) printable segments are shown through the dotted patterning and the thickened critical thin segments are shown via the diagonal patterning.

Note that the thin segment redesign engine 110 need not include the (previously determined) non-critical thin segments as part of the thickened cross-sectional slice 310. This may be the case as the criticality criteria applied in classifying such non-printable segments as non-critical indicates that imprecise 3D printing of these sections is user-tolerable. Hence, the thin segment redesign engine 110 may redesign the cross-sectional slice 210 such that these non-critical thin segments are not included, and thus not constructed by the 3D printer. In other implementations, the thin segment redesign engine 110 may merge the non-critical thin segments into the thickened cross-sectional slice 310 even though a 3D printer may be incapable of precisely printing these sections given the printer resolution T.

The thickening process for critical thin segments may introduce sharp corners in the thickened cross-sectional slice 310. This may occur as the added material of thickened critical thin segments may sharply intersect or sharply overlap with neighboring printable segments of the 3D model. In some implementations, the thin segment redesign engine 110 identifies boundary intersections between the thickened critical thin segments and neighboring printable segments as sharp corners added to the critical thin segment by the thickening. FIG. 3 highlights some example sharp corners 320 introduced by the thickening at various intersections between the depicted printable segments and thickened critical thin segments. The thin segment redesign engine 110 may further modify a 3D model to smooth these introduced sharp corners.

Figure 4:
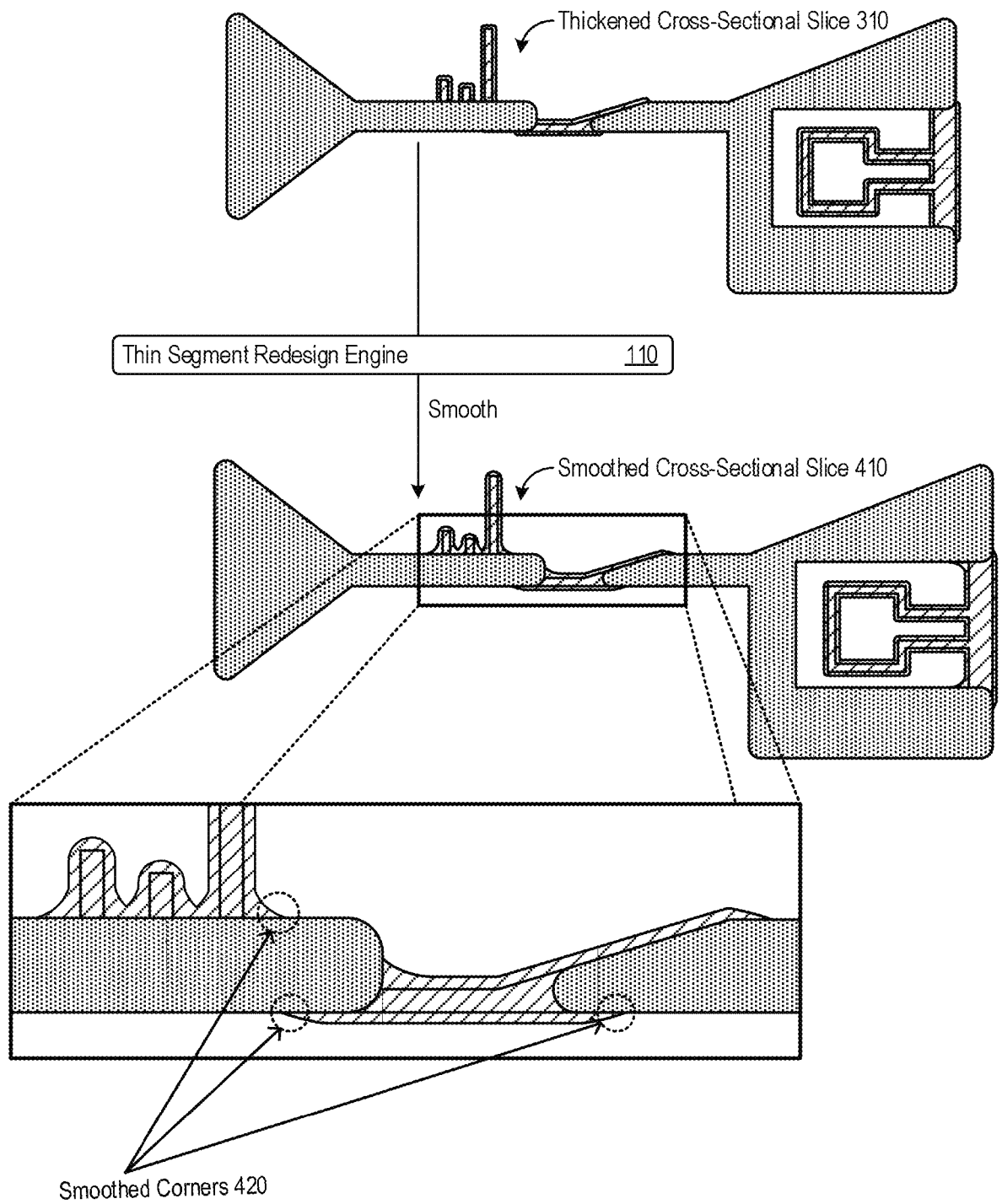
FIG. 4 shows an example of slice modification by a thin segment redesign engine to smooth corners of a thickened cross-sectional slice.

FIG. 4 shows an example of slice modification by the thin segment redesign engine 110 to smooth corners of a thickened cross-sectional slice 310. As noted above, the thin segment redesign engine 110 may detect a newly introduced corner at the intersection point between the perimeter (e.g., boundary) of the thickened critical thin segments $\hat{q}_i$ and the perimeter (e.g., boundary) of a neighboring printable segment. The intersection of these perimeters may form a sharp corner as the dilation operation used in the thickening process may thicken the critical thin segments in a manner and shape such that the thickened critical thin segment intersects sharply with subsequently merged printable segments.

The thin segment redesign engine 110 may smooth sharp corners introduced by the thickening process. For each boundary intersection point (thus detected as a sharp corner), the thin segment redesign engine 110 may modify a selected region of the thickened cross-sectional slice 310 surrounding the intersection point via application of a smoothing operation. For instance, the thin segment redesign engine 110 may identify a region surrounding the sharp corner with a region size determined based on a factor of the printer resolution T. As an illustrative example, the thin segment redesign engine 110 may identify such a region as the connected neighborhood of the intersection point (and thus, detected sharp corner) along the boundary of the thickened cross-sectional slice 310 that are less than distance 2d away, where d represents the diameter of the 3D printer resolution T. Within this identified region and points along the boundary (e.g., perimeter) of the thickened cross-sectional slice 310, the thin segment redesign engine 110 may apply a curve interpolation to smooth the sharp corner.

In some implementations, the thin segment redesign engine 110 replaces the boundary of thickened cross sectional slice 310 in the identified region (surrounding the sharp corner) with a smooth interpolated Bezier curve. The thin segment redesign engine 110 may determine a set of points along the cross-sectional slice perimeter in the connected neighborhood of the identified region (within a distance of 2d), using these determined points to generate the smooth Bezier curve.

To avoid bias in Bezier curve due to ill-distribution of points on the slice perimeter in the identified region, the thin segment redesign engine 110 may resample the slice perimeter in the identified region with N number of uniformly distributed points, both ends inclusive. This parameter N may be a user-configurable parameter applied by the thin segment redesign engine 110. The thin segment redesign engine 110 may control the resampling such that each N−2 interior resampled point is equidistant from its two immediate neighboring points. These uniformly distributed points may be used by the thin segment redesign engine 110 as control points to interpolate an N−1 order Bezier curve. Then, the thin segment redesign engine 110 may resample the obtained Bezier curve at uniformly distributed parameter values between 0 and 1. The number of samples may be kept equal to the original number of points on the slice perimeter in the identified region, and the thin segment redesign engine 110 may replace these original points on the slice perimeter with the new points sampled on the Bezier curve.

Thus, for a particular detected sharp corner, the thin segment redesign engine 110 may perform a smoothing process to modify the thickened cross-sectional slice 310 to ensure precise construction of the slice given the printer resolution T. The thin segment redesign engine 110 may repeat this smoothing process for each detected sharp corner on the perimeter of the thickened cross-sectional slice 310 at which thickened critical thin segment boundaries intersect with neighboring printable segment boundaries.

The resultant smoothed slice generated by the thin segment redesign engine 110 may be the final additive near net shape $S^f$ of the redesigned slice to be constructed by the 3D printer. In FIG. 4, a redesigned slice $S^f$ is shown as the smoothed cross-sectional slice 410. The smoothed cross-sectional slice 410 shown in FIG. 4 includes the smoothed corners 420, which respectively replace the sharp corners 320 shown in FIG. 3. Thus, the thin segment redesign engine 110 may smooth sharp corners introduced by a thickening process to obtain a smoothed cross-sectional slice 410.

The thin segment redesign engine 110 may perform smoothing operations at various points of slice redesign. In some implementations, the thin segment redesign engine 110 performs the thickening and smoothing processes separately in sequence. In these implementations, the thin segment redesign engine 110 may iteratively dilate identified critical thin segments until a thickening criterion is satisfied, after which the thin segment redesign engine 110 may smooth out any introduced sharp corners detected at boundary intersection points.

In other implementations, the thin segment redesign engine 110 may perform smoothing operations at boundary intersection points during each dilation iteration. In a given dilation iteration, the thin segment redesign engine 110 may dilate a critical thin segment with the applicable dilation shape and then perform a smoothing operation at points of the dilated critical thin segment that intersect with neighboring printable segments. In that regard, each dilation iteration may include a thickening-smoothing sequence performed by the thin segment redesign engine 110. As such, the thin segment redesign engine 110 may smooth sharp corners introduced during thickening of critical thin segments.

In any of the ways described above, the thin segment redesign engine 110 may redesign cross-sectional slices of a 3D model to account for identified critical thin segments, including through thickening and smoothing processes.

Figure 5:
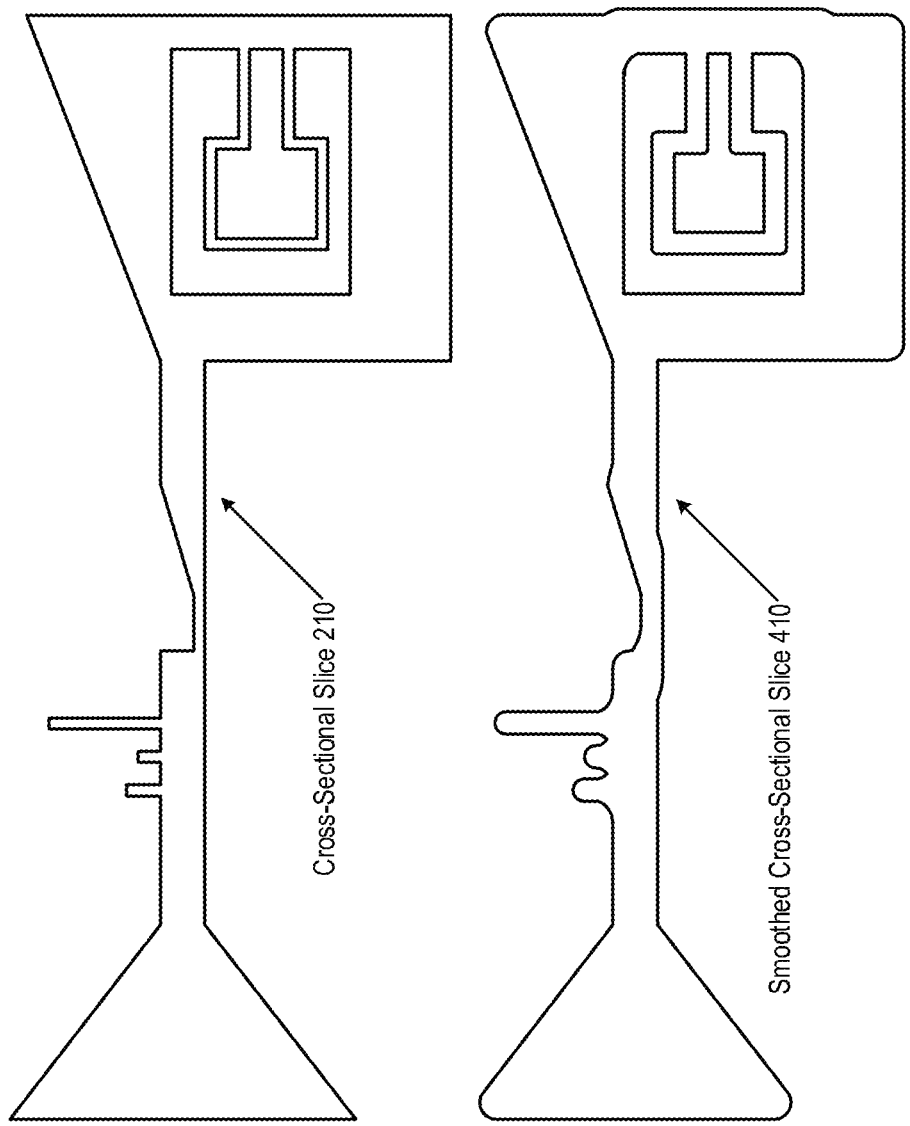
FIG. 5 shows a comparison between an example cross-sectional slice prior to modification and an example modified cross-sectional slice.

FIG. 5 shows a comparison between an example cross-sectional slice prior to modification and an example modified cross-sectional slice. In particular, FIG. 5 shows side-by-side the cross-sectional slice 210 from FIG. 2 that the thin segment identification engine 108 may extract from a 3D model 120 as well as the smoothed cross-sectional slice 410 from FIG. 4 resulting from a redesign by the thin segment redesign engine 110. By redesigning the cross-sectional slice 210 into the smoothed cross-sectional slice 410, the system 100 may ensure that critical thin segments are constructible given a 3D printer resolution. Non-critical thin segments may be removed from the slice during the redesign process, as imprecise construction of the slice at these non-critical portions is user-tolerable. After construction of the smoothed cross-sectional slice 410 (and other redesigned slices), subtractive engineering processes may be employed to remove added material and realize the original shape, area, and size of the critical thin segments 240 in the 3D model 120

The smoothed cross-sectional slice 410 illustrates a slice redesign specific to the cross-sectional slice 210 extracted from the 3D model 120. In a consistent manner, the thin segment identification engine 108 and thin segment redesign engine 110 may identify critical thin segments and redesign each of the other slices of the 3D model 120 through the critical thin segment identification, thickening, and smoothing features described herein.

The thin segment redesign engine 110 may aggregate redesigned slices into a modified 3D model. As the redesigned slices provide a 2D representation of a particular plane of the 3D model, the thin segment redesign engine 110 may extend each redesigned slice along the build direction by a slice height. In doing so, the thin segment redesign engine 110 may produce a 3D representation of the redesigned slice, which may in effect represent a layer (or multiple layers) of 3D printing. The thin segment redesign engine 110 may extend the cross-sectional slices by a slice height along the build direction, opposite the build direction, or along a combination of both. For instance, the thin segment redesign engine 110 may extend each redesigned slice symmetrically by half of the layer height (e.g., thickness) along the build direction (up a z-axis representation of the build direction) and by half of the layer height opposite the build direction (down the z-axis). Extending each redesigned slice may yield a 3D representation of the redesigned slice that can be combined with other 3D redesigned slices to form a modified 3D model for 3D printing.

To obtain the modified 3D model, the thin segment redesign engine 110 may combine the extended slices (e.g., via a Boolean union operation) to form the modified 3D model.

Figure 6:
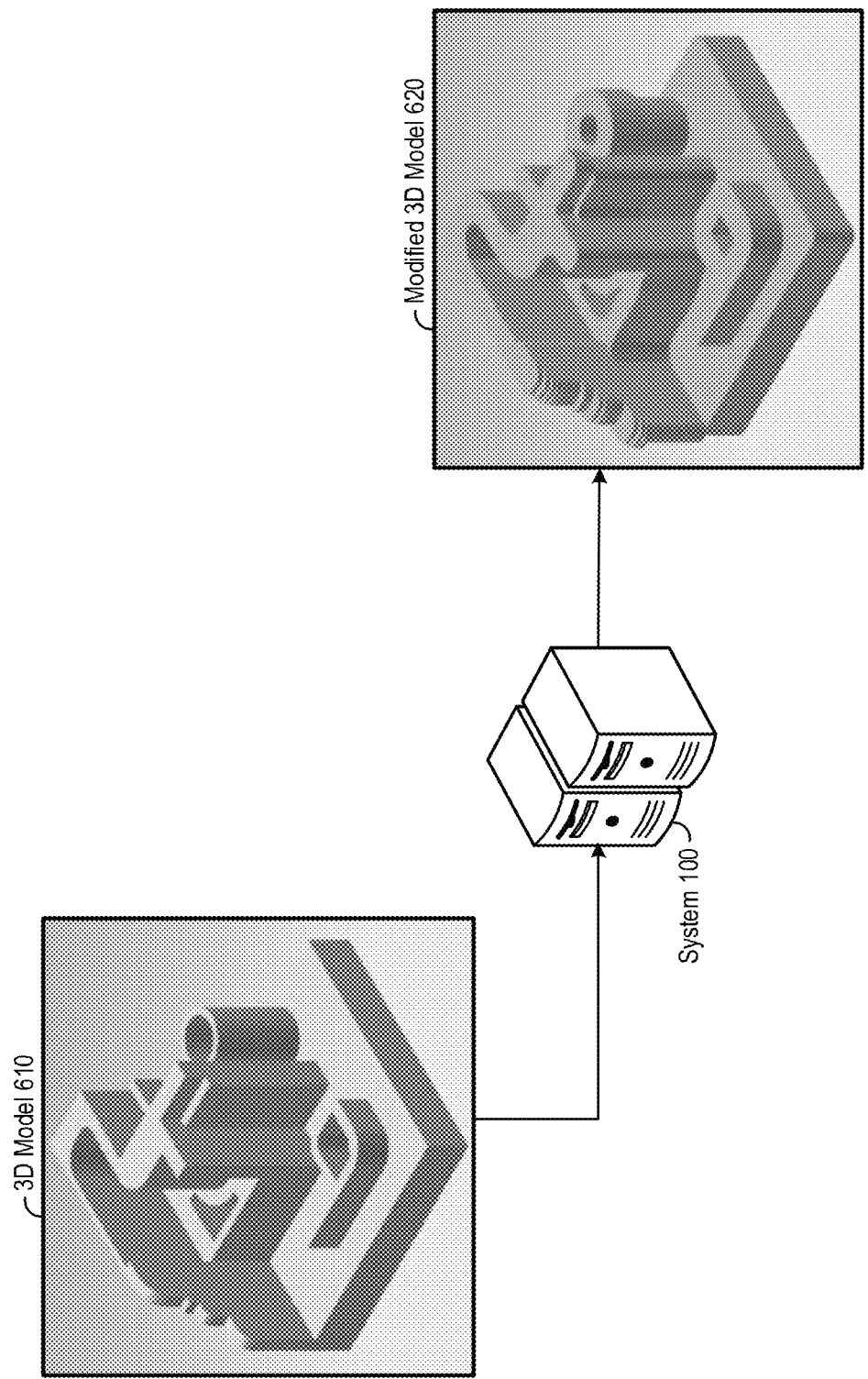
FIG. 6 shows an example modification to a 3D model by a CAD system.

FIG. 6 shows an example modification to a 3D model by a CAD system. In the example shown in FIG. 6, the system 100 redesigns the 3D model 610 into the modified 3D model 620 using the various thin segment identification and redesign features described herein. The resultant modified 3D model 620 may have a stair-step effect between slices, rather than having a smooth surface. For illustrative purposes, the modified 3D model 620 is shown at an increased granularity such that the stair-step effects are observable. However, the thin segment redesign engine 110 may control or limit such effects by reducing slice thickness values (e.g., by extracting more cross-sectional slices from the 3D model 610 and thereby reduce the height between extracted slices).

In some scenarios, independent slice redesign may result in overhangs present in the modified 3D model 620. Such overhangs may require support structures during 3D printing to properly construct the object. In some implementations, a CAD system may redesign critical thin segments accounting for allowable overhang. Examples of such features are described next with respect to FIG. 7.

Figure 7:
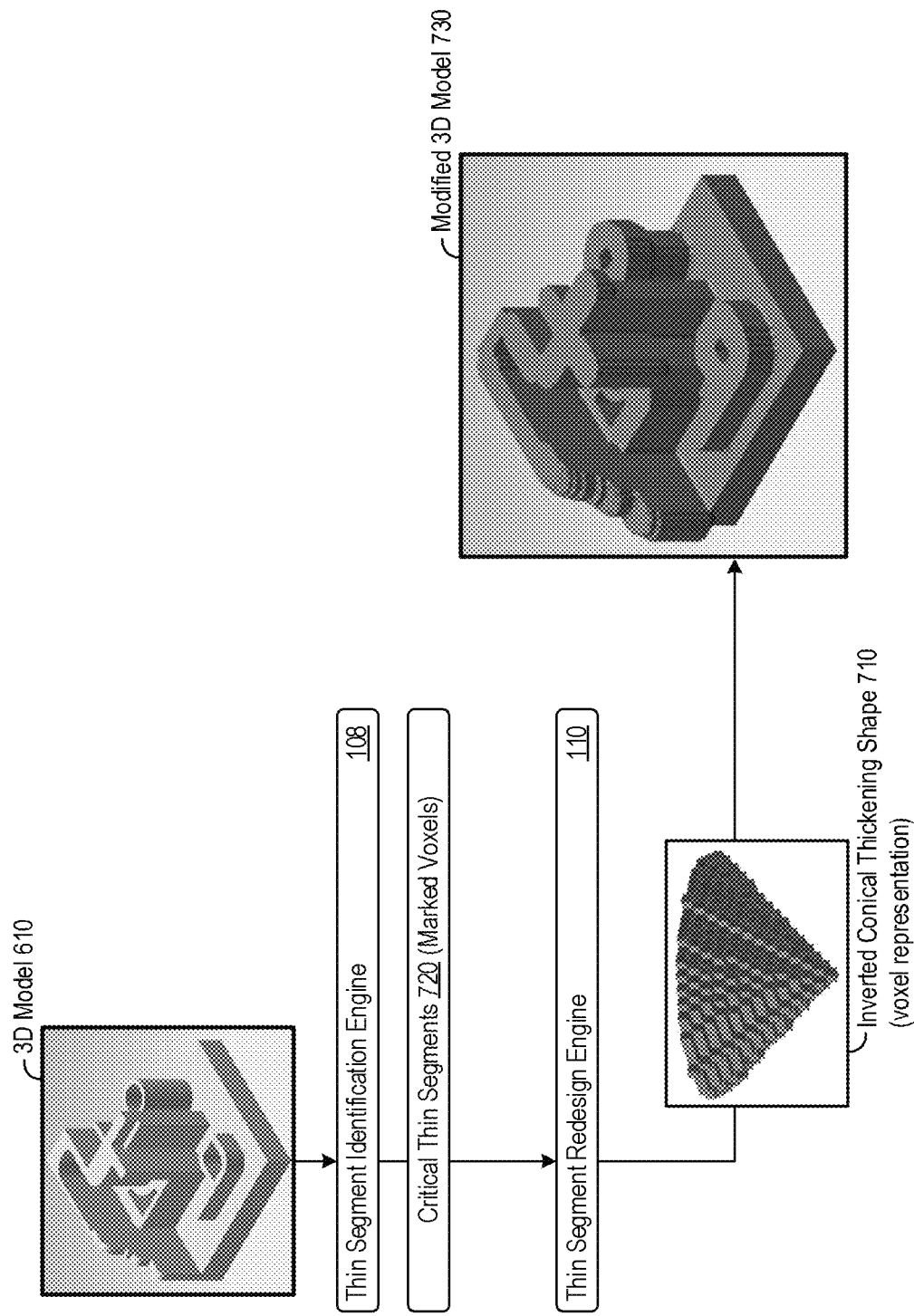
FIG. 7 shows an example of slice modification using an inverted conical thickening shape.

FIG. 7 shows an example of slice modification using an inverted conical thickening shape. To reduce or eliminate for overhangs during slice redesign, a system may thicken critical thin segments in a 3D space, doing so with a thickening shape that accounts for a permitted overhang angle/structure in 3D printing. FIG. 7 shows an example of such a thickening shape through the inverted conical thickening shape 710.

The inverted conical thickening shape 710 may be specifically designed such that thickening of critical thin segments in the 3D model 610 will not produce overhangs requiring support structures during 3D printing. In some examples, the thin segment redesign engine 110 constructs the inverted conical thickening shape 710 in a voxel representation. The thin segment redesign engine 110 may construct the inverted conical thickening shape 710 with the center of the cone base (in this case, base circle) as a reference/origin and with the negative z-axis (opposite the build direction) passing through the vertex of the inverted conical thickening shape 710.

The thin segment redesign engine 110 may set the slant angle of the inverted conical thickening shape 710 (also referred to as conical slant angle) as equal to or less than a tolerable overhang angle for 3D printing. The tolerable overhang angle may be a characteristic specific to the 3D printer used to construct the object (e.g., as supplied by a printer manufacturer) or a general limitation parameter applied to designs. As an illustrative example, if a 3D printing process tolerates a 10° overhang angle, then the thin segment redesign engine 110 may set the slant angle of the inverted conical thickening shape 710 as equal to 10° or less than 10°. As such, the thin segment redesign engine 110 may determine the conical slant angle based on an allowable overhang parameter specified for construction of the object with the 3D printer.

The specific slant angle set for the inverted conical thickening shape 710 may control the geometric parameters of the base circle (e.g., diameter, radius, and area), the height of the inverted conical thickening shape 710, or a combination of both. A CAD system may use the slant angle of the inverted conical thickening structure 710 as one parameter upon which the height and base circle area (and/or diameter and radius) of the inverted conical thickening shape 170 are set.

In some implementations, the height of the inverted conical thickening shape 710 may be equal to a slice height (also referred to as slice thickness) of cross-sectional slices extracted by the thin segment identification engine 108. Doing so may ensure that dilation by the inverted conical thickening shape 710 with the conical slant angle will ensure that the shape of added material to the critical thin segments will not have overhang structures that exceed a tolerable overhang angle for 3D printing. In such examples, a system may determine slice thicknesses and the thickening shape height based on a desired base circle area, diameter, or radius or vice-versa.

To illustrate through a first example, the thin segment redesign engine 110 may configure the base circle of the inverted conical thickening shape 710 to have a diameter of d (like that of the 3D printer resolution T), which may then configure the area of the base circle. In this first example, the inverted conical thickening shape 710 has a reference point at a center of a cone base of the inverted conical thickening shape 170 and the cone base has a diameter equal a diameter associated with the printer resolution T (i.e., the diameter d of the 2D circle shape for printer resolution T). The base circle diameter and slant angle may, in turn, control the height of the inverted conical thickening shape 710 (e.g., requiring a particular shape height to maintain the slant angle). In this first example, the determined height of the inverted conical thickening shape 710 is then used as a slice thickness parameter by the thin segment identification engine 108 to extract cross-sectional slices from the 3D model 610.

To illustrate through a second example, the thin segment identification engine 108 or a CAD system may set a particular slice thickness for cross-sectional slice extractions (e.g., to ensure a threshold number of slices are extracted from the 3D model 610 or to enforce a desired distance between slices). In such examples, the thin segment redesign engine 110 may set the height of the inverted conical thickening structure 710 as equal to the slice height, and the shape height and conical slant angle together control the required diameter (and thus area) of the base circle. In each of these two examples, the height of the inverted conical thickening shape 710 used by the thin segment redesign engine 110 may be set as equal to a slice height of the cross-sectional slices extracted by the thin segment identification engine 108.

In some implementations, a system may set the height of the inverted conical thickening shape 710 as less than the slice thickness of extracted cross-sectional slices, as discussed below.

To perform slice redesign in a 3D space using the inverted conical thickening shape 710, a system may access a 3D representation of the 3D model 610. For example, the thin segment identification engine 108 may convert the 3D model 610 into a voxel representation (or any other 3D representation). To identify critical thin segments present in the 3D model 610, the thin segment identification engine 108 may extract cross-sectional slices and perform the critical thin segment identification processes described herein. Each slice may be a single voxel in thickness, and voxels corresponding to identified critical thin segments may be marked by the thin segment identification engine 108. In FIG. 7, the thin segment identification engine 108 provides the identified critical thin segments 720 (e.g., on a per slice basis) to the thin segment redesign engine 110. The critical thin segments 720 may include or take the form of marked voxels in the voxel representation of the 3D model 610. In some examples, the thin segment redesign engine 110 thickens the marked voxels by computing Minkowski sums of the critical thin segment with the inverted conical thickening shape 710, which may be flexibly used to thicken critical thin segments for other non-voxel geometrical representations as well (e.g., polygonal or 3D surface representations).

The thin segment redesign engine 110 may redesign extracted slices using the inverted conical thickening shape 710. To do so, the thin segment redesign engine 110 may dilate marked voxels corresponding to critical thin segments. The thin segment redesign engine 110 may use the inverted conical thickening shape 710 as the structuring element or filter for 3D morphological operations, such a 3D a dilation operation, with the center of the base circle serving as the origin/reference point. As the extracted slice may be represented in a 3D voxel space, the thin segment redesign engine 110 may, in effect, modify the voxel representation of the 3D model 610 through the dilation.

3D morphological dilation of the critical thin segments of an extracted slice with a 3D shape may impact voxels above the slice (in reference to the build direction), thus making 3D changes to the 3D model during dilation. In that regard, the 2D cross-sectional slice of the 3D model 610 may be thought of as a base plane upon which 3D dilation occurs. When the inverted conical thickening shape 710 has a shape height equal to the slice thickness, deposition material added through dilation with the inverted conical thickening shape 710 may form an upward slant (in reference to the build direction) across the entire height of the slice, thus doing so with a slant angle tolerable for 3D printing. In other implementations, the thin segment redesign engine 110 uses the slice as a top plane upon which the 3D dilation occurs, thus impacting voxels located and forming tolerable downward slant angles below the slice (in reference to the build direction). In yet other implementations, the thin segment redesign engine 110 treats the slice as a mid-point plane (or other configurable proportion between a base and top plane) in which the dilation impacts voxels both below and above the cross-sectional slice. In each of these various implementations, the thin segment redesign engine 110 may perform the 3D dilation with the inverted conical thickening shape 710 such that the added deposition material in the 3D model is formed at an slant angle tolerable for 3D printing without requiring support structures.

As such, the thin segment redesign engine 110 may ensure that any thickened portions of the 3D model are done so with 3D modifications at a slant angle tolerable for 3D printing.

In some examples, the thin segment redesign engine 110 may set the height of the inverted conical thickening shape 710 as less than the slice thickness of extracted cross-sectional slices. In these implementations, the thin segment redesign engine 110 may set a particular diameter or area for the base circle which, when combined with the conical slant angle, require a shape height less than the slice thickness of extracted slices. In these implementations, the dilations using the inverted conical thickening shape 710 by the thin segment redesign engine 110 may involve multiple dilations along the build direction (or possibly, opposite the build direction) to ensure that added material covers the entire slice thickness. In such cases, the thin segment redesign engine 110 may continue to perform dilation operations with the inverted conical thickening shape 710 upwards or downwards along the build direction (e.g., a z-axis perpendicular to the plane of the cross-sectional slice) until the dilation covers the entire slice thickness.

The thin segment redesign engine 110 may perform the 3D dilation with the inverted conical thickening shape 710 until a thickening criterion is satisfied (e.g., with respect to the printer resolution T as applied to the critical thin segments identified in the 2D cross-sectional slice). In some examples, the thin segment redesign engine 110 dilates the critical thin segments in a single iteration. This may be possible when the base circle diameter of the inverted conical thickening shape 710 is equal to the diameter d of the 3D printer resolution T, and thus a single dilation iteration may ensure the thickening criterion is satisfied. The appropriate slant angle of the thickened critical thin segments (as provided by the inverted conical thickening shape 710) may ensure that the resultant redesigned slice does not create overhangs requiring support structures during 3D printing. In other examples, the thin segment redesign engine 110 dilates the critical thin segments of a cross-sectional slice across multiple dilation iterations, for example a reduced slice thickness is configured that decreases the area of the base circle of the inverted conical thickening shape 710 (and thus potentially requiring multiple dilation iterations to satisfy the thickening criterion).

The thin segment redesign engine 110 may redesign each extracted slice of the 3D model 610 using the inverted conical thickening shape 710 and combine the redesigned slice to form the modified 3D model 730. As the thickening process is performed with a 3D thickening shape in a 3D space, the thin segment redesign engine 110 need not extend the redesigned slices along the build direction. The thin segment redesign engine 110 may directly combine the redesigned slices (in a voxel representation) to form a modified 3D model (in the voxel representation). The thin segment redesign engine 110 may convert the voxel representation into a surface mesh to obtain the modified 3D model 730 (for example, though application of a marching cubes process).

Since the modified 3D model 730 has been thickened with appropriate slant angles, a 3D printer may construct an object represented by the modified 3D model 730 without requiring support structures. In that regard, a system may modify a 3D model to account for critical thin segments and do so generating a modified 3D model that does not require support structures for 3D construction.

In FIG. 7, 3D dilation is described through use of an inverted conical thickening shape 710. However, the thin segment redesign engine 110 may use any inverted thickening shape so long as the slant angle of such a shape meets tolerable overhang parameters for 3D printing. The thin segment redesign engine 110 may vary use of different 3D thickening or dilation shapes based on an arbitrary 2D shape associated with a 3D printer resolution T. That is, the thin segment redesign engine 110 may use a variety of inverted conical shapes with a variety shapes forming the cone base. The thin segment redesign engine 110 may construct an inverted thickening shape using the arbitrary 2D shape as a base (e.g., a base circle for the inverted conical thickening shape 710), the center of the arbitrary 2D shape as a reference/origin, a shape height equal to the slice thickness (or any other configurable or desired height), and the negative z-axis (opposite the build direction) passing through the vertex of the inverted thickening shape.

Many of the examples provided in FIG. 7 are done so in the context of a 3D voxel representation. However, the thin segment redesign engine 110 may apply consistent 3D redesign features using other types of 3D model representations as well, for example polygonal or CAD surface representations. In these examples, the thin segment redesign engine 110 may construct or access a representation of the inverted conical thickening shape 710 (or other applicable thickening shape) and dilate critical thin segments (e.g., as represented as polylines or polygonal meshes) to account for tolerable overhang. Such 3D dilation may be performed through, for example Minkowski sums or other 3D dilation techniques applicable to various 3D geometric representations besides voxels.

Figure 8:
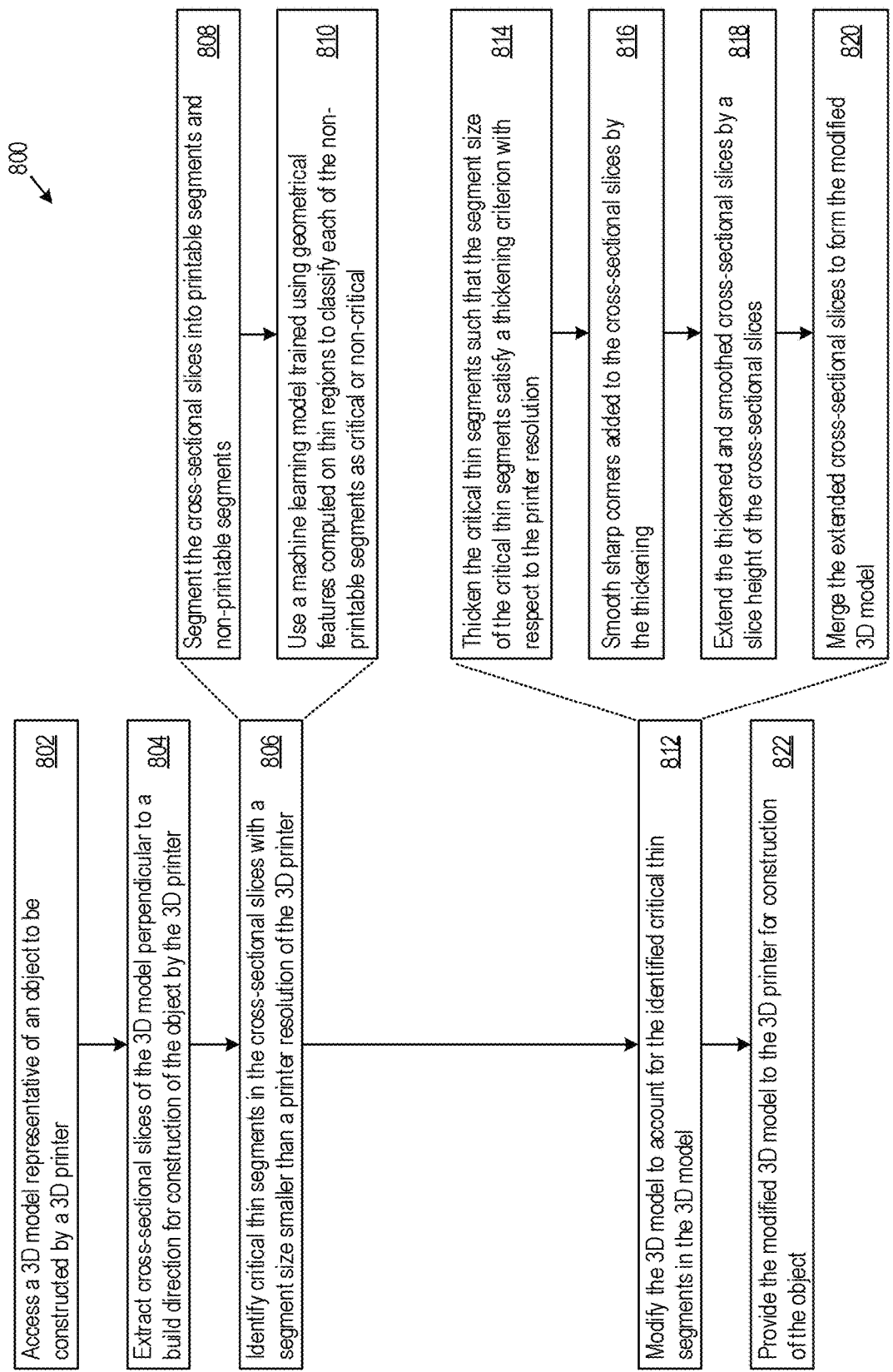
FIG. 8 shows an example of logic that a system may implement to identify and redesign critical thin segments in 3D model that are below 3D printer resolution.

FIG. 8 shows an example of logic that a system may implement to identify and redesign critical thin segments in 3D model that are below 3D printer resolution. For example, the system 100 may implement the logic 800 as hardware, executable instructions stored on a machine-readable medium, or as a combination of both. The system 100 may implement the logic 800 via the thin segment identification engine 108 and the thin segment redesign engine 110, through which a system may perform or execute the logic 800 as a method to identify and redesign critical thin segments of an object. The following description of the logic 800 is provided using the thin segment identification engine 108 and the thin segment redesign engine 110 as implementation examples. However, various other implementation options by a system are possible.

In implementing the logic 800, the thin segment identification engine 108 may access a 3D model representative of an object to be constructed by a 3D printer (802) and extract cross-sectional slices of the 3D model perpendicular to a build direction for construction of the object by the 3D printer (804). The thin segment identification engine 108 may identify critical thin segments in the cross-sectional slices with a segment size smaller than a printer resolution of the 3D printer (806). For instance, the thin segment identification engine 108 may segment (e.g., divide) the cross-sectional slices into printable and non-printable segments (808) and use a machine learning model trained using geometric features computed for thin regions (e.g., a linear SVM) to classify the non-printable segments as critical or non-critical (810).

In implementing the logic 800, the thin segment redesign engine 110 may modify the 3D model to account for the identified critical thin segments in the 3D model (812). For instance, the thin segment redesign engine 110 may thicken the critical thin segments such that the segment size of the critical thin segments satisfy a thickening criterion with respect to the printer resolution (814), smooth sharp corners added to the cross-sectional slices by the thickening (816), extend the thickened and smoothed cross-sectional slices by the slice height of the cross-sectional slices (818), and merge the extended cross-sectional slices to form the modified 3D model (820). Then, the thin segment redesign engine 110 may provide the modified 3D model to the 3D printer for construction of the object (822). In some implementations, a system may include 3D printing capabilities to construct the object in accordance with the modified 3D model.

Figure 9:
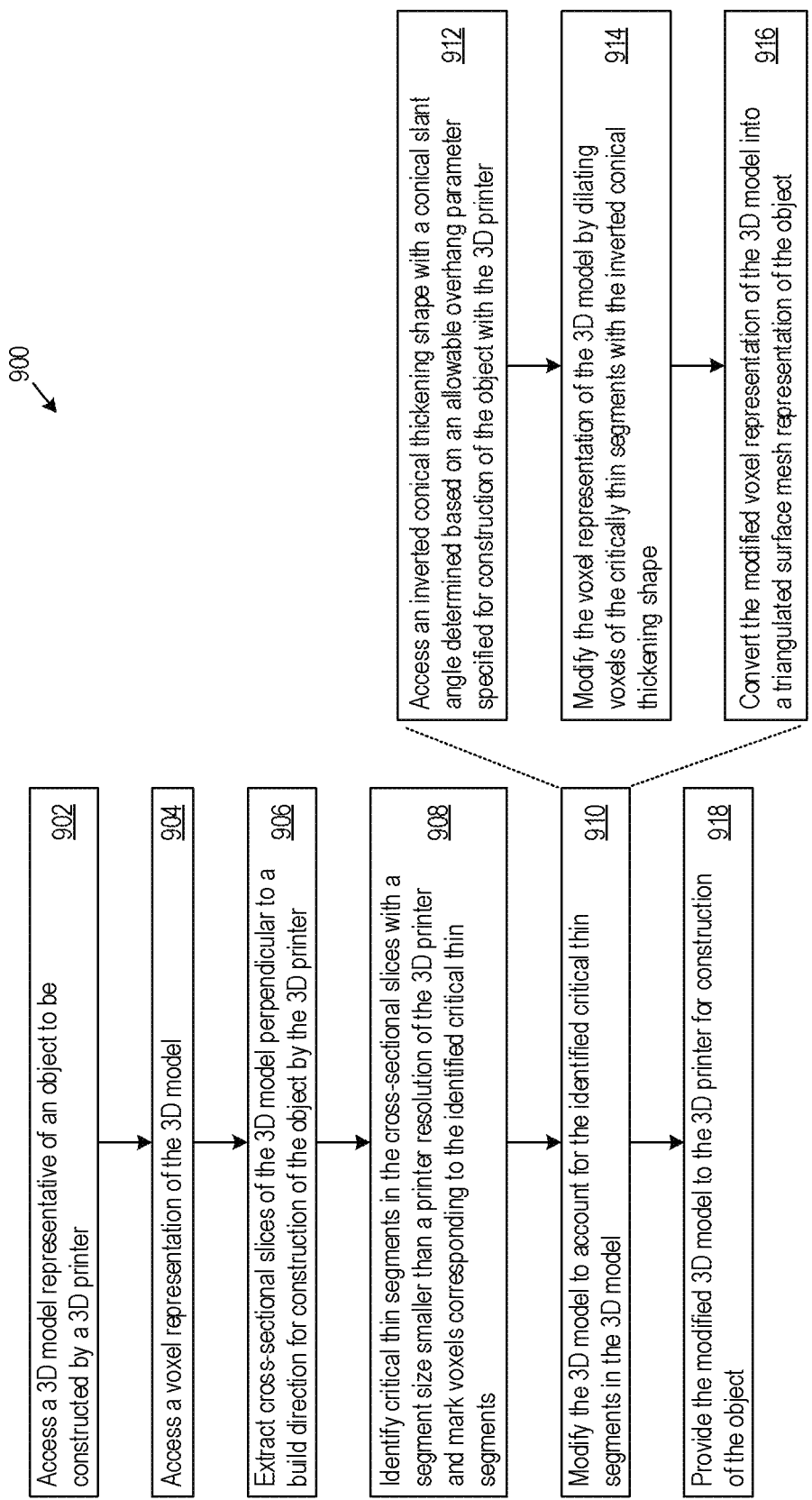
FIG. 9 shows another example of logic that a system may implement to identify and redesign critical thin segments in 3D model that are below 3D printer resolution.

FIG. 9 shows another example of logic 900 that a system 100 may implement to identify and redesign critical thin segments in 3D model that are below 3D printer resolution. For example, the system 100 may implement the logic 900 as hardware, executable instructions stored on a machine-readable medium, or as a combination of both. The system 100 may implement the logic 900 via the thin segment identification engine 108 and the thin segment redesign engine 110, through which a system may perform or execute the logic 900 as a method to identify and redesign critical thin segments of an object. The following description of the logic 900 is provided using the thin segment identification engine 108 and the thin segment redesign engine 110 as implementation examples. However, various other implementation options by a system are possible.

In implementing the logic 900, the thin segment identification engine 108 may access a 3D model representative of an object to be constructed by a 3D printer (902), access a voxel representation of the 3D model (904), and extract cross-sectional slices of the 3D model perpendicular to a build direction for construction of the object by the 3D printer (906), for example with a slice thickness of a single or multiple voxels. The thin segment identification engine 108 may identify critical thin segments in the cross-sectional slices with a segment size smaller than a printer resolution of the 3D printer and mark voxels corresponding to the identified critical thin segments (908).

In implementing the logic 900, the thin segment redesign engine 110 may modify the 3D model to account for the identified critical thin segments in the 3D model (910). In doing so, the thin segment redesign engine 110 may access an inverted conical thickening shape with a conical slant angle determined based on an allowable overhang parameter specified for construction of the object with the 3D printer (912), modify the voxel representation of the 3D model by dilating voxels of the critically thin segments with the inverted conical thickening shape (914), and convert the modified voxel representation of the 3D model into a triangulated surface mesh representation of the object (916), for example through application of a marching cubes algorithm. Then, the thin segment redesign engine 110 may provide the modified 3D model to the 3D printer for construction of the object (918). In some implementations, a system may include 3D printing capabilities to construct the object in accordance with the modified 3D model.

Voxel representations are used as an example 3D representation in FIG. 9. However, the logic 900 may be consistently applicable and implemented for geometric representations of other types, such as polygonal representations, CAD surface representations, and more. In such cases, the thin segment redesign engine 110 may use inverted thickening shapes constructed in the applicable geometric representation and 3D dilation techniques to thicken critical thin segments (e.g., via Minkowski sums). As such, the logic 900 may support critical thin segment redesign to account for overhangs during 3D printing.

While various examples are shown through FIGS. 8 and 9, the logic 800 or logic 900 may include any number of additional or alternative steps as well. The logic 800 or logic 900 may additionally or alternatively implement any other thin segment identification or redesign features described herein, for example with respect to the thin segment identification engine 108, the thin segment redesign engine 110, or both.

Figure 10:
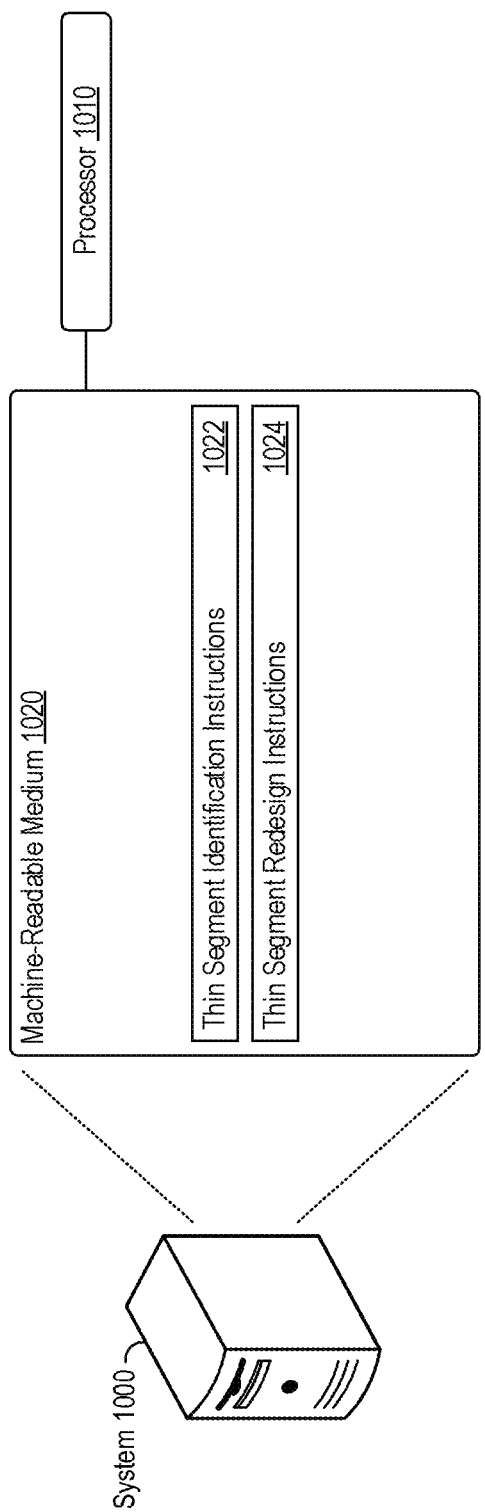
FIG. 10 shows an example of a system that supports identification and redesign of critical thin segments in 3D model that are below 3D printer resolution.

FIG. 10 shows an example of a system 1000 that supports identification and redesign of critical thin segments in 3D model that are below 3D printer resolution. The system 1000 may include a processor 1010, which may take the form of a single or multiple processors. The processor(s) 1010 may include a central processing unit (CPU), microprocessor, or any hardware device suitable for executing instructions stored on a machine-readable medium. The system 1000 may include a machine-readable medium 1020. The machine-readable medium 1020 may take the form of any non-transitory electronic, magnetic, optical, or other physical storage device that stores executable instructions, such as the thin segment identification instructions 1022 and the thin segment redesign instructions 1024 shown in FIG. 10. As such, the machine-readable medium 1020 may be, for example, random access memory (RAM) such as a dynamic RAM (DRAM), flash memory, spin-transfer torque memory, an electrically-erasable programmable read-only memory (EEPROM), a storage drive, an optical disk, and the like.

The system 1000 may execute instructions stored on the machine-readable medium 1020 through the processor 1010. Executing the instructions may cause the system 1000 (or any other CAD system) to perform any of the thin segment identification and redesign features described herein, including according to any of the features with respect to the thin segment identification engine 108, the thin segment redesign engine 110, or a combination of both.

For example, execution of the thin segment identification instructions 1022 by the processor 1010 may cause the system 1000 to access a 3D model representative of an object to be constructed by a 3D printer; extract a cross-sectional slice of the 3D model perpendicular to a build direction for construction of the object by the 3D printer; and identify a critical thin segment in the cross-sectional slice with a segment size smaller than a printer resolution of the 3D printer.

Execution of the thin segment redesign instructions 1024 by the processor 1010 may cause the system 1000 to modify the 3D model to account for the critical thin segment, including by thickening the critical thin segment such that the segment size of the critical thin segment satisfies a thickening criterion with respect to the printer resolution; identifying, at an intersection between the critical thin segment and a neighboring printable segment, a sharp corner added to the cross-sectional slice by the thickening; and further modifying the critical thin segment by smoothing the sharp corner; as well as provide the modified 3D model to the 3D printer for construction of the object.

The systems, methods, devices, and logic described above, including the thin segment identification engine 108 and the thin segment redesign engine 110, may be implemented in many different ways in many different combinations of hardware, logic, circuitry, and executable instructions stored on a machine-readable medium. For example, the thin segment identification engine 108, the thin segment redesign engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the thin segment identification engine 108, the thin segment redesign engine 110, or combinations of both.

The processing capability of the systems, devices, and engines described herein, including the thin segment identification engine 108 and the thin segment redesign engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:
1. A method comprising:
accessing a three-dimensional (3D) model representative of an object to be constructed by a 3D printer;
extracting a cross-sectional slice of the 3D model perpendicular to a build direction for construction of the object by the 3D printer;
segmenting the cross-sectional slice into printable segments and non-printable segments, wherein the non-printable segments have a segment size smaller than a printer resolution of the 3D printer;

using a machine learning model trained using geometrical features computed on thin regions to classify each of the non-printable segments as a critical non-printable segment or a non-critical non-printable segment;

modifying the 3D model by thickening the critical non-printable segments such that the segment size of the critical non-printable segments satisfy a thickening criterion with respect to the printer resolution;

determining not to redesign the non-critical non-printable segments in the 3D model even though the non-critical non-printable segments have a segment size smaller than a printer resolution of the 3D printer; and providing the modified 3D model to the 3D printer for construction of the object, wherein the determining not to redesign the non-critical non-printable segments in the 3D model comprises including the non-critical non-printable segments in the modified 3D model.

2. The method of claim 1, wherein thickening the critical non-printable segments comprises, for a given critical non-printable segment:

incrementally thickening the given critical non-printable segment with a dilation shape over a number of dilation iterations; and incrementally increasing the thickening amount over successive dilation iterations based on a function of the number of iterations and the printer resolution.

3. The method of claim 1, wherein modifying the 3D model further comprises, for a given critical non-printable segment:

identifying, at an intersection between the critical non-printable segment and a neighboring printable segment, a sharp corner added to the cross-sectional slice by the thickening; and smoothing the sharp corner through curve interpolation.

4. The method of claim 1, wherein modifying the 3D model by thickening the critical non-printable segments comprises, for a given critical non-printable segment:

modifying the 3D model by thickening the given critical thin-non-printable segment with an inverted conical thickening shape with a conical slant angle determined based on an allowable overhang parameter specified for construction of the object with the 3D printer.

5. The method of claim 4, wherein the inverted conical thickening shape is 3D, has a reference point at a center of a cone base of the inverted conical thickening shape and the cone base has a diameter equal to a diameter associated with a 2D representation of the printer resolution.

6. The method of claim 4, wherein modifying the 3D model by thickening the critical thin segments comprises, for the given critical non-printable segment, modifying a voxel representation of the 3D model by dilating the given critical non-printable segment with the inverted conical thickening shape; and further comprising converting the modified voxel representation of the 3D model into a triangulated or CAD surface representation of the object.

7. A non-transitory machine-readable medium comprising instructions executable by a processor to:

access a three-dimensional (3D) model representative of an object to be constructed by a 3D printer;

extract a cross-sectional slice of the 3D model perpendicular to a build direction for construction of the object by the 3D printer;

segment the cross-sectional slice into printable segments and non-printable segments, wherein the non-printable segments have a segment size smaller than a printer resolution of the 3D printer;

classify each of the non-printable segments as a critical non-printable segment or a non-critical non-printable segment;

modify the 3D model by thickening the critical non-printable segments such that the segment size of the critical non-printable segments satisfy a thickening criterion with respect to the printer resolution;

determine not to redesign the non-critical non-printable segments in the 3D model even though the non-critical non-printable segments have a segment size smaller than a printer resolution of the 3D printer, wherein determination not to redesign the non-critical non-printable segments in the 3D model comprises modifying the 3D model to remove the non-critical non-printable segments; and provide the modified 3D model to the 3D printer for construction of the object.

8. The non-transitory machine-readable medium of claim 7, wherein the instructions executable to thicken the critical non-printable segments comprise instructions executable to, for a given critical non-printable segment:

incrementally thicken the given critical non-printable segment with a dilation shape over a number of dilation iterations; and incrementally increase a size of the dilation shape over successive dilation iterations based on a function of the number of iterations and the printer resolution.

9. The non-transitory machine-readable medium of claim 7, wherein the instructions further comprise instructions executable to smooth a sharp corner at an intersection between a given critical non-printable segment and a neighboring printable segment, including by:

identifying a region surrounding the sharp corner with a region size determined based on a factor of the printer resolution; and applying a curve interpolation in the identified region surrounding the sharp corner to smooth the sharp corner.

10. The non-transitory machine-readable medium of claim 7, wherein the thickening criterion is satisfied when the segment size of the thickened critical thin segments exceed a threshold percentage of the printer resolution.

11. The non-transitory machine-readable medium of claim 7, wherein the instructions to modify the 3D model comprise instructions further to:

extend the cross-sectional slice by a slice height of the cross-sectional slice; and merge the extended cross-sectional slice with other extended cross-sectional slices to form the modified 3D model.

12. A system comprising:

a thin segment identification engine configured to:

access a three-dimensional (3D) model representative of an object to be constructed by a 3D printer;

extract cross-sectional slices of the 3D model perpendicular to a build direction for construction of the object by the 3D printer;

segment the cross-sectional slices into printable segments and non-printable segments;

use machine learning model trained using geometrical features computed on thin regions to classify each of the non-printable segments as a critical non-printable segment or a non-critical non-printable segment; and a thin segment redesign engine configured to:
   modify the 3D model by thickening the critical non-printable segments such that the segment size of the critical non-printable segments satisfy a thickening criterion with respect to the printer resolution;
   determine not to redesign the non-critical non-printable segments in the 3D model even though the non-critical non-printable segments have a segment size smaller than a printer resolution of the 3D printer, wherein the thin segment redesign engine is configured to determine not to redesign the non-critical non-printable segments in the 3D model by modifying the 3D model to remove the non-critical non-printable segments; and
   provide the modified 3D model to the 3D printer for construction of the object.

13. The system of claim 12, wherein the thin segment redesign engine is further configured to, after thickening the critical non-printable segments:
   extend the cross-sectional slices by a slice height of the cross-sectional slices along the build direction, opposite the build direction, or along a combination of both; and
   merge the extended cross-sectional slices to form the modified 3D model.

14. The system of claim 12, wherein the thin segment redesign engine is configured to thicken the critical non-printable segments by, for a given critical non-printable segment:
   incrementally thickening the given critical non-printable segment with a dilation shape over a number of dilation iterations; and
   incrementally increasing a size of the dilation shape over successive dilation iterations based on a function of the number of iterations and the printer resolution.

15. The system of claim 12, wherein the thin segment redesign engine is further configured to smooth a sharp corner at an intersection between a given critical non-printable segment and a neighboring printable segment, including by:
   identifying a region surrounding the sharp corner with a region size determined based on a factor of the printer resolution; and
   applying a curve interpolation in the identified region surrounding the sharp corner to smooth the sharp corner.

16. The system of claim 12, wherein the thickening criterion is satisfied when the segment size of the thickened critical thin segments exceed a threshold percentage of the printer resolution.

17. The system of claim 12, wherein the thin segment redesign engine is configured to thicken the critical non-printable segments with an inverted conical thickening shape with a conical slant angle determined based on an allowable overhang parameter specified for construction of the object with the 3D printer.

18. The system of claim 17, wherein the inverted conical thickening shape is 3D, has a reference point at a center of a cone base of the inverted conical thickening shape and the cone base has a diameter equal to a diameter associated with a 2D representation of the printer resolution.

* * * * *